(12) United States Patent
Kitagawa et al.

(10) Patent No.: US 6,357,021 B1
(45) Date of Patent: Mar. 12, 2002

(54) METHOD AND APPARATUS FOR UPDATING FIRMWARE

(75) Inventors: Masayuki Kitagawa; Koji Tsuboi; Masanori Matsunaga, all of Irvine, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/291,800

(22) Filed: Apr. 14, 1999

(51) Int. Cl.$^7$ .......................... G06F 11/36; G06F 11/00
(52) U.S. Cl. ................. 714/41; 714/38; 717/11
(58) Field of Search .................... 714/41, 38, 32, 714/736, 25, 799; 717/4, 11; 365/244; 710/72; 703/22; 700/86; 706/922

(56) References Cited

U.S. PATENT DOCUMENTS 5,022,028 A * 6/1991 Edmonds et al.
5,617,533 A * 4/1997 Wu et al.
5,764,989 A * 6/1998 Gustafsson et al.
6,052,750 A * 4/2000 Lea

* cited by examiner

Primary Examiner—Gopal C. Ray
(74) Attorney, Agent, or Firm—Knobbe Martens Olson & Bear LLP

(57) ABSTRACT

A peripheral device and method are provided for reliably updating and checking firmware or other coded information stored within a nonvolatile memory of the device. The device comprises a microcontroller and a memory with a fixed part and an updateable part. Both the fixed part and the updateable part store firmware. When firmware in the updateable part is updated (such as by using a USB connection with a host PC), a first error detection code is generated and stored in the updateable part. As part of an initialization procedure, the firmware stored in the fixed part generates a second error detection code based on the updated firmware stored in the updateable part and compares the second error detection code to the first error detection code stored in the updateable part. If the error detection codes indicate that the firmware stored in the updateable part is valid, the microcontroller uses the firmware stored in the updateable part to operate the device; otherwise, the microcontroller uses firmware stored in the fixed part to operate the device.

7 Claims, 2 Drawing Sheets

METHOD AND APPARATUS FOR UPDATING FIRMWARE

BACKGROUNG OF THE INVENTION

1. Field of the Invention

The present invention relates to an apparatus and methods for reliably updating firmware or other coded information stored within a nonvolatile memory of a peripheral device.

2. Description of the Related Art

Various types of microcontroller-controlled devices exist which are adapted to communicate with a PC or other type of computer. These devices include, for example, optical drives, magnetic disc drives, hard drives, modems (both internal and external), Personal Digital Assistants (PDAs), solid state memory cards, network interfaces, video cameras, digital cameras, printers, scanners, and fax machines. These and other such devices will be referred to herein as "peripheral devices," and the computer with which the device communicates will be referred to as the "host computer."

Some peripheral devices are capable of receiving firmware modifications or updates from the host computer, such as to eliminate bugs or to add new functions to the device (as used herein, "firmware " refers to the executable code and any associated data used to control the operation of the device). Some peripheral device bus standards, such as Universal Serial Bus (USB), allow a user to unplug and plug (disconnect and connect) a peripheral device, such as a CD-R/W drive, while the host computer is running. In some instances, a user may unintentionally (or intentionally) unplug or disconnect a peripheral device from the peripheral device bus, or turn off the host computer, while the peripheral device is receiving or processing a firmware update from the host computer. This may result in corrupted firmware being stored in the nonvolatile memory of the peripheral device, and can potentially render the device inoperable. In addition, there are other situations, such as a momentary power failure during firmware updates, which may result in incomplete or corrupted firmware.

A CD-R/W drive is a type of peripheral device that is capable of recording and reading data to and from an optical disk. A CD-R/W drive may communicate with a host computer, such as a personal computer (PC), over a peripheral device bus, such as a Universal Serial Bus (USB). As described below, a CD-R/W drive is one type of peripheral device to which the present invention may be applied.

SUMMARY OF THE INVENTION

The present invention relates to a system and method for reliably updating and checking firmware stored within a nonvolatile memory of a peripheral device. In accordance with the invention, the nonvolatile memory includes a fixed portion and an updateable portion. The updateable portion stores an updateable version of the basic firmware for the device, and stores a corresponding error detection code (preferably a CRC code) to permit the validity of such firmware to be verified. The fixed portion contains an initialization routine, and includes a default version of the device's basic firmware To update the device's firmware, the host transmits to the device the new version of the updateable firmware together with a corresponding error detection code, and both are stored in the updateable portion in place of the existing firmware and error detection code. When the device is reset, the device's microcontroller executes the initialization routine to perform an initialization sequence. As part of this sequence, the microcontroller calculates the error detection code for the firmware currently stored in the updateable portion and then compares this value to the error detection code stored in the updateable portion. If a match occurs, the updateable version is deemed valid and is used to control the device; otherwise, the default version stored in the fixed portion is used. In the event of a mismatch, the user may also be notified by sending a message to the host computer and/or by displaying a message on a display of the peripheral device.

DETAILED DESCRIPTION OF THE PREFERRED EMBODIMENTS

A preferred embodiment of the present invention is described herein, which is intended to illustrate, and not limit, the scope of the invention.

Figure 1:
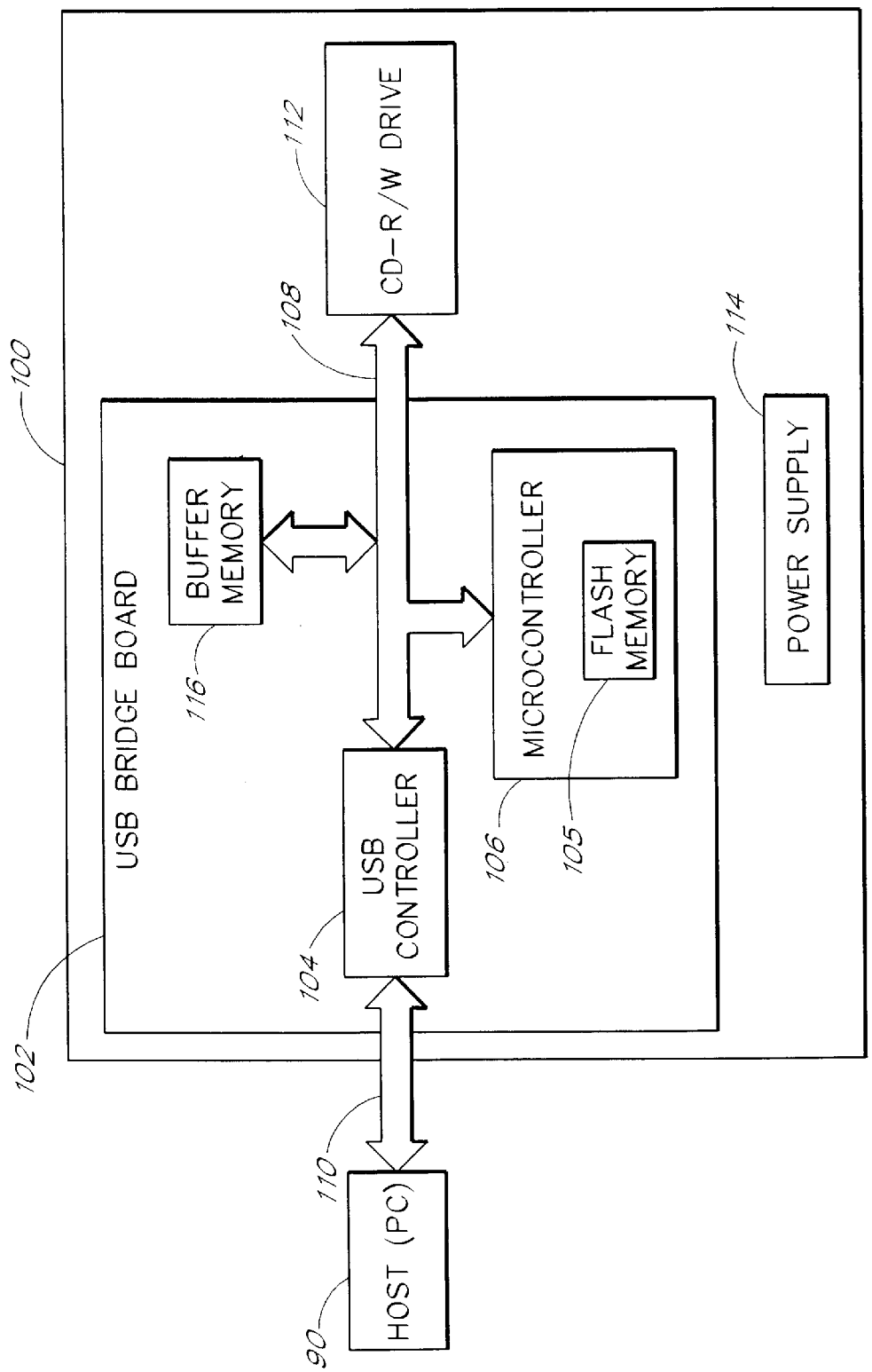
FIG. 1 illustrates one configuration of an apparatus in accordance with one embodiment of the present invention.

FIG. 1 illustrates one embodiment of a peripheral device 100 suitable for use with one embodiment of the present invention. The device 100 may be provided with its own housing and configured to be external to a host computer housing (not shown). Alternatively, in another embodiment, the device 100 is configured to be mounted within a host computer housing. In FIG. 1, the device 100 is coupled to a host computer 90, such as a personal computer. The host computer 90 includes a host microprocessor (not shown), such as a Pentium III or a Sun Sparc processor. The host computer 90 typically runs an appropriate operating system, such as Microsof® Windows 98, Microsoft® Windows® NT, the Apple® MacOS®, Unix, Linux, or IBM®OS/2® operating systems. The device 100 is coupled to the host computer 90 via a peripheral device bus, such as a USB bus 110. In other embodiments, other bus architectures or interfaces may be used in place of the USB bus 110, such as an IEEE 1394 interface, an Integrated Drive Electronics (IDE)/ ATAPI interface or a Small Computer Standard Interface (SCSI). In addition, the invention can be used where the firmware updates are made over an infrared or other wireless interface.

The device 100 comprises an optical disc drive 112, a USB bridge board 102 and a power supply 114. The device 100 is preferably compliant with the USB specification, Revision 1.1 and with the USB mass storage class definition. The disk drive 112 may be, for example, a compact disc read/write drive (CD-RIW drive). Alternatively, the present invention may be implemented with other devices as well. For example, the peripheral device could be a hard drive, a DVD drive, a magnetic disc drive, a modem (either internal and external), a Personal Digital Assistant (PDA), a solid state memory, a scanner, a printer, a network interface, a fax machine, a video camera, a digital camera, or the like.

The CD-R/W drive is configured to accept rewritable CD (CD-RW) discs, write-once CD (CD-R) discs, CD-ROM discs, and musical CDs. Similarly, if the drive 112 is a DVD drive, the drive 112 may be capable of accepting the various CD disc-types, as well as rewritable DVD discs, write-once DVD discs, and read-only DVD discs.

In FIG. 1, the CD-R/W drive 112 is a standard Advanced Technology Attachment Packet Interface (ATAPI) CD-R/W drive. The USB bridge board 102 comprises a USB controller 104, a microprocessor or microcontroller 106, an ATAPI interface 108 and a buffer memory 116. The buffer 116 may be a FIFO. The drive 112 is coupled to the USB bridge board 102 via the ATAPI interface 108, and the USB bridge board 102 is coupled to the host 90 via the USB bus 110.

In general, the USB bridge board 102 receives ATAPI packet commands from the host 90 via the USB bus 110 and transfers the packets to the drive 112 via the ATAPI interface 108. The bridge board 102 transfers data between the USB bus 110 and the ATAPI interface 108 and uses the buffer 116 to buffer the data being transferred. The bridge board 102 handles USB and/or ATAPI protocol, such as composing and decomposing packets for the USB bus 110, and appropriately accesses ATAPI registers (not shown) for the ATAPI interface 108. Thus, the USB bridge board 102 advantageously permits a standard ATAPI drive 112 to be connected to a USB bus 110. Alternatively, in another embodiment, the optical drive 112 is directly USB compatible.

In FIG. 1, the microcontroller 106 manages the operation of the bridge board 102. The USB controller 104 handles the interface to the USB bus 110. The buffer 116 is sized to allow data to be read or written in a stream from or to the optical disc. In one configuration, the buffer 116 is 2 Mbytes in size, but other buffer sizes may alternatively be used. Power for the device 100 may be provided by a local power supply 114. In another embodiment, the device 100 may be powered by the USB bus 110 itself.

In FIG. 1, the microcontroller 106 comprises an internal flash memory 105, which contains firmware used to control the operation of the device 100. Alternatively, in another configuration, the memory 105 is external to the microcontroller 106. In addition, other types of nonvolatile memories, such as EEPROMS, could be used instead of or in addition to the flash memory.

Figure 2:
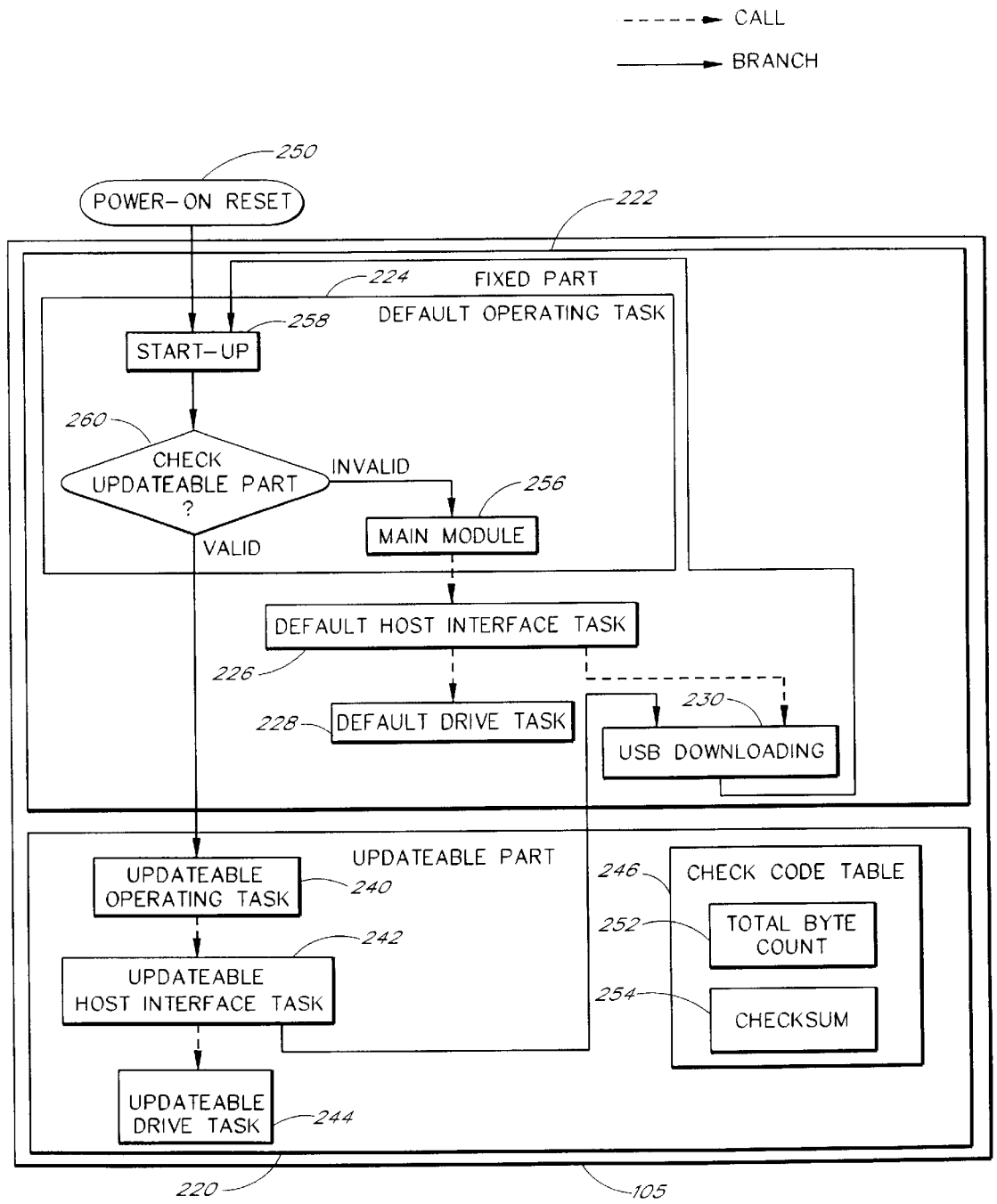
FIG. 2 illustrates one configuration of a nonvolatile memory associated with the apparatus of FIG. 1, and illustrates a firmware update process.

FIG. 2 illustrates one configuration of the flash memory 105 associated with the microcontroller 106 of FIG. 1, and illustrates a firmware update process. The flash memory 105 comprises two portions, an updateable part 220 and a fixed part 222. The updateable part 220 stores one or more tables, such as a check code table 246, and one or more tasks, such as an updateable operating task 240, an updateable host interface task 242 and an updateable drive task 244. Each task comprises one or more modules (not shown), and each module comprises one or more firmware functions (not shown). The check code table 246 comprises data values, such as a total byte count 252 and a checksum 254. The total byte count 252 maintains a count of the total number of bytes of firmware stored in the updateable part 220. The checksum 254 is used by firmware stored in the fixed part 222 to verify the validity of the firmware stored in the updateable part 220, as described in more detail below.

The fixed part 222 stores one or more tasks, such as a default operating task 224, a default host interface task 226, a default drive task 228 and a USB downloading task 230. The default operating task comprises a start-up module 258 and a main module 256.

The updateable part 220 stores firmware which may be downloaded and updated in-whole or in-part by the host 90 (FIG. 1) via the USB bus 110. In some cases, the firmware updates may simply be in the form of revised data tables used by the executable code. The host computer (not shown) runs a utility that in used to allow the user to initiate downloads of firmware to the peripheral device. As described below, this utility may be configured to notify the user when the firmware stored in the updateable portion is determined to be corrupt.

The fixed part 222 preferably remains unchanged when the host 90 downloads firmware updates. Thus, the firmware stored in the fixed part 222 will not be lost or corrupted by incomplete downloading by the host 90 to the flash memory 105. The firmware stored in the fixed part 222 preferably implements all of the basic functions needed for the device 100 to operate properly. Thus, the disk drive 112 may operate normally, using the firmware stored in the fixed part 222, if the updateable part becomes corrupted.

In the preferred embodiment, the product is shipped with valid firmware stored in both the fixed and updateable parts 220, 222, with valid total byte count and checksum valves 252, 254 (reflecting the firmware stored in the updateable part 220) stored in the check code table 246. Alternatively, the device 100 could be shipped with no valid firmware in the updateable part 220, in which case the absence of valid firmware can be reflected by a total byte count 252 of zero or an invalid checksum.

The operation of the device 100 and the flash memory 105 is described with reference to FIGS. 1 and 2. In a power-on/reset block 250 in FIG. 2, the microcontroller 106 receives a power-on or a reset signal from the host 90. The microcontroller 106 begins executing the start-up module 258 of the default operating task 224 in the fixed part 222. The start-up module 258 initializes hardware and initializes variables (not shown). In a decision block 260 of FIG. 2, the default operating task 224 determines whether the firmware stored in the updateable part 220 is valid. In the preferred embodiment, the validity is checked by calculating a checksum for the firmware stored in the updateable part 220, and then comparing this checksum to the checksum value stored in the check code table 246. If a match occurs, the firmware in the updateable part 220 is deemed valid.

The checksum valve 254 is preferably calculated by software on the host side which prepares the firmware updates before the updates are sent across the USB bus 110. Alternatively, the checksum could be provided by the developer or distributor with the update. Various error detection codes or data checking methods, such as cyclic redundancy codes (CRC), may be used to check the validity of the firmware stored in the updateable part 220.

If the firmware stored in the updateable part 220 is valid, then the default operating task 224 proceeds to the operating task 240 stored in the updateable part 220, as shown in FIG. 2. The operating task 240, the host interface task 242 and the drive task 244 stored in the updateable part 220 control the normal operations of the bridge board 102, as described above with reference to FIG. 1.

If the firmware stored in the updateable part 220 is not valid (e.g., the program is corrupted), then the default operating task 224 proceeds to the default host interface task 226, as shown in FIG. 2. The default host interface task 226 and the default drive task 228 perform functions which are substantially similar to the normal bridge board functions performed by the host interface task 242 and the drive task 244 of the updateable part 220.

The default operating task 224 or the default host interface task 226 may notify the host 90 that the microcontroller 106 is executing firmware stored in the fixed part 222, in which case the host 90 may prompt the user to reattempt the firmware download. Alternatively, in another configuration, the host 90 checks whether the microcontroller 106 is executing firmware in the fixed part 222 or the updateable part 220. Alternatively, the default operating task 224 or the default host interface task 226 may cause the device 100 notify the user directly by generating a message, such as "invalid firmware update," on a display, such as a LED display.

When the host 90 initiates downloading of a firmware update, the default host interface task 226 or the host interface task 242 (depending upon whether the updateable firmware is corrupt) causes the USB downloading task 230 to overwrite some or all of the firmware stored in the updateable part 220, including the byte count and checksum values 252, 254, with the firmware provided by the host 90. As part of this process, the firmware provided by the host 90 may initially be written to the buffer 116 (FIG. 1), and then copied from the buffer 116 to flash memory 105 by the microcontroller 106.

After the USB downloading task 230 downloads a firmware update to the updateable part 220, the USB downloading task 230 jumps to the start-up module 258 of the default operating task 224, as shown in FIG. 2. The default operating task 224 again determines whether the firmware stored in the updateable part 220 is valid. If the firmware stored in the updateable part 220 is valid, then the default operating task 224 passes the operation of the microcontroller 106 to the operating task 240 stored in the updateable part 220, as shown in FIG. 2.

FIG. 2 illustrates one configuration of a sequence of tasks, modules and tables used by the microcontroller 106, but the tasks, modules and tables may be used by the microcontroller 106 to perform other functions. In addition, other tasks, modules and/or tables may be used in addition to or instead of the tasks and modules shown in FIG. 2.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. A peripheral device, comprising:

a microcontroller; and a nonvolatile memory which stores firmware that is executed by the microcontroller, the nonvolatile memory comprising:

an updateable part which stores updateable firmware, the updateable firmware comprising an error detection code that is provided by a host computer during firmware updating to permit the updateable firmware to be verified; and a fixed part which stores fixed firmware, the fixed firmware including an initialization routine which uses the error detection code stored within the updateable part to determine whether the updateable firmware is valid, the fixed firmware further including default firmware which is used in place of the updateable firmware when the updateable firmware is invalid.

2. The device of claim 1, in combination with a host software utility which notifies a user when the updateable firmware is invalid.

3. The device of claim 1, wherein the device is an optical drive.

4. The device of claim 1, wherein the device comprises a USB interface.

5. In a microcontroller-controlled device with a nonvolatile memory, a method of updating and checking firmware stored in the nonvolatile memory, comprising:

receiving from a host computer a firmware update, including a first error detection code, and storing the firmware update within an updateable part of the nonvolatile memory;

using firmware stored within a fixed part of the nonvolatile memory to compute a second error detection code based on firmware stored in the updateable part of the nonvolatile memory;

comparing the first and second error detection codes to determine whether the firmware stored in the updateable part of the nonvolatile memory is valid; and when, based on said comparing, the firmware stored in the updateable part is not valid, executing default firmware stored in the fixed part to control normal operation of the device.

6. The method of claim 5, further comprising notifying a user when the firmware stored in the updateable part is invalid.

7. The method of claim 5, wherein receiving the firmware update comprises receiving the update over a USB cable.

* * * * *